United States Patent
Nishioka et al.

(10) Patent No.: US 9,840,954 B2
(45) Date of Patent: Dec. 12, 2017

(54) EXHAUST PURIFICATION DEVICE FOR INTERNAL COMBUSTION ENGINE

(71) Applicant: TOYOTA JIDOSHA KABUSHIKI KAISHA, Toyota-shi, Aichi (JP)

(72) Inventors: Hiromasa Nishioka, Susono (JP); Kazuhiro Ito, Mishima (JP); Yoshihisa Tsukamoto, Susono (JP); Hiroshi Otsuki, Gotenba (JP); Yasumasa Notake, Susono (JP); Daichi Imai, Shizuoka (JP); Ryota Koutake, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/030,724

(22) PCT Filed: Aug. 26, 2014

(86) PCT No.: PCT/JP2014/072859
§ 371 (c)(1),
(2) Date: Apr. 20, 2016

(87) PCT Pub. No.: WO2015/060014
PCT Pub. Date: Apr. 30, 2015

(65) Prior Publication Data
US 2016/0281565 A1  Sep. 29, 2016

(30) Foreign Application Priority Data
Oct. 22, 2013  (JP) .................................. 2013-219344

(51) Int. Cl.
*F01N 3/00* (2006.01)
*F01N 3/08* (2006.01)
*F01N 3/20* (2006.01)

(52) U.S. Cl.
CPC ......... *F01N 3/0814* (2013.01); *F01N 3/0842* (2013.01); *F01N 3/2013* (2013.01);
(Continued)

(58) Field of Classification Search
USPC ......... 60/275, 277, 286, 295, 297, 300, 301, 60/303
See application file for complete search history.

(56) References Cited

U.S. PATENT DOCUMENTS 5,323,868 A * 6/1994 Kawashima ............. B60K 6/46
123/142.5 E
5,713,198 A  2/1998 Aoki et al.
(Continued)

FOREIGN PATENT DOCUMENTS

DE  10 2010 001 778 A1  9/2010
EP  1 186 764 A2  3/2002
(Continued)

*Primary Examiner* — Binh Q Tran
(74) *Attorney, Agent, or Firm* — Andrews Kurth Kenyon LLP (57) ABSTRACT

An exhaust purification device for an internal combustion engine is provided with an $NO_x$ adsorbent for adsorbing $NO_x$ in exhaust gas and an $NO_x$ purifying catalyst for purifying $NO_x$ in exhaust gas, which are arranged in an engine exhaust passage. An electric heater is provided for raising the temperature of the $NO_x$ adsorbent. When a signal requesting startup of an internal combustion engine is issued, the device starts to supply electric power to the electric heater before the internal combustion engine completely warms up, and supplies the electric heater with a quantity of electric power making the temperature of the $NO_x$ adsorbent equal to or higher than the moisture desorption temperature but lower than the $NO_x$ desorption temperature.

10 Claims, 10 Drawing Sheets

(52) U.S. Cl.
CPC ........ *F01N 3/2066* (2013.01); *F01N 2410/06* (2013.01); *F01N 2900/1631* (2013.01); *Y02T 10/26* (2013.01)

(56) References Cited

U.S. PATENT DOCUMENTS

| | | | | |
|---|---|---|---|---|
| 6,718,857 | B2 * | 4/2004 | Kimmel | B23D 47/04 83/447 |
| 8,151,555 | B2 * | 4/2012 | Niimi | F01N 3/0871 60/284 |
| 8,327,622 | B2 * | 12/2012 | Sano | F01N 13/009 60/284 |
| 8,443,587 | B2 * | 5/2013 | Narayanaswamy | F01N 3/2013 60/285 |
| 9,038,376 | B2 * | 5/2015 | Petrovic | F02M 25/0718 60/274 |
| 2003/0172646 | A1 | 9/2003 | Hiratsuka et al. | |
| 2011/0265460 | A1 | 11/2011 | Hirai et al. | |

FOREIGN PATENT DOCUMENTS

| | | |
|---|---|---|
| JP | H7-238826 A | 9/1995 |
| JP | H10-184345 A | 7/1998 |
| JP | 2002-155736 A | 5/2002 |
| JP | 2004-176636 A | 6/2004 |
| JP | 2005-180198 A | 7/2005 |
| JP | 2010-184183 A | 8/2010 |
| JP | 2010-270616 A | 12/2010 |
| JP | 2012-107567 A | 6/2012 |
| JP | 2003-343334 A | 12/2013 |
| WO | 2009/127941 A1 | 10/2009 |

* cited by examiner

EXHAUST PURIFICATION DEVICE FOR INTERNAL COMBUSTION ENGINE

CROSS-REFERENCE TO RELATED APPLICATIONS

This is a national phase application based on the PCT International Patent Application No. PCT/JP2014/072859 filed Aug. 26, 2014, claiming priority to Japanese Patent Application No. 2013-219344 filed Oct. 22, 2013, the entire contents of both of which are incorporated herein by reference.

TECHNICAL FIELD

The present invention relates to an exhaust purification device for an internal combustion engine.

BACKGROUND ART

Known in the past has been an internal combustion engine which arranges an $NO_x$ adsorbent for adsorbing $NO_x$ in exhaust gas and an $NO_x$ purifying catalyst for purifying $NO_x$ in the exhaust gas in an engine exhaust passage. In this internal combustion engine, the $NO_x$ in the exhaust gas is adsorbed at the $NO_x$ adsorbent from when engine operation has started to when the temperature of the $NO_x$ purifying catalyst reaches the activation temperature, therefore the release of $NO_x$ into the atmosphere is suppressed.

In this regard, while engine operation is suspended, the gas which is present in the engine exhaust passage contains moisture. This moisture is adsorbed at the $NO_x$ adsorbent before the engine is restarted. As a result, when the engine is restarted, the quantity of $NO_x$ which the $NO_x$ adsorbent can adsorb is reduced by the quantity of moisture which is adsorbed at the $NO_x$ adsorbent. That is, before the temperature of the $NO_x$ purifying catalyst reaches the activation temperature, the quantity of $NO_x$ which is released into the atmosphere is liable to increase by the quantity of moisture which is adsorbed at the $NO_x$ adsorbent.

Therefore, known has been an internal combustion engine which attaches an electric heater to an $NO_x$ adsorbent, calculates a quantity of moisture which is adsorbed at the $NO_x$ adsorbent, operates the electric heater to raise the temperature of the $NO_x$ adsorbent when the quantity of adsorbed moisture exceeds a threshold quantity, and thereby makes the $NO_x$ adsorbent release the moisture (see PLT 1).

CITATIONS LIST

Patent Literature

PLT 1: Japanese Patent Publication No. 2002-155736A

SUMMARY OF INVENTION

Technical Problem

However, in PLT 1, a moisture release action is not performed until the quantity of adsorbed moisture becomes a threshold quantity. As a result, leaving aside right after the moisture release action is performed, the quantity of $NO_x$ which the $NO_x$ adsorbent can adsorb is reduced by the quantity of moisture which is adsorbed at the $NO_x$ adsorbent. Therefore, before the temperature of the $NO_x$ purifying catalyst reaches the activation temperature, the quantity of $NO_x$ which is released into the atmosphere is liable to be increased. Alternatively, it is necessary to increase the adsorption capacity of the $NO_x$ adsorbent by the quantity of the adsorbed moisture.

Solution to Problem

According to the present invention, there is provided an exhaust purification device for an internal combustion engine, wherein an $NO_x$ adsorbent for adsorbing $NO_x$ in exhaust gas and an $NO_x$ purifying catalyst for removing $NO_x$ in the exhaust gas are arranged in an engine exhaust passage, the $NO_x$ adsorbent having the property of the adsorbed moisture starting to be desorbed when raising the temperature of the $NO_x$ adsorbent and the temperature of the $NO_x$ adsorbent reaches a moisture desorption temperature and of the adsorbed $NO_x$ starting to be desorbed when further raising the temperature of the $NO_x$ adsorbent and the temperature of the $NO_x$ adsorbent reaches an $NO_x$ desorption temperature, wherein the device is further provided with an electric heater for raising the temperature of the $NO_x$ adsorbent, and wherein the device starts to supply electric power to the electric heater before the internal combustion engine is completely warmed up when a signal which requests startup of the internal combustion engine is issued, and supplies the electric heater with a quantity of electric power making the temperature of the $NO_x$ adsorbent equal to or higher than the moisture desorption temperature but lower than the $NO_x$ desorption temperature.

Advantageous Effects of Invention

It is possible to suppressing release of $NO_x$ in the atmosphere until the temperature of the $NO_x$ purifying catalyst reaches the activation temperature, while maintaining the absorption capacity of $NO_x$ the absorbent small.

DESCRIPTION OF EMBODIMENTS

Figure 1:
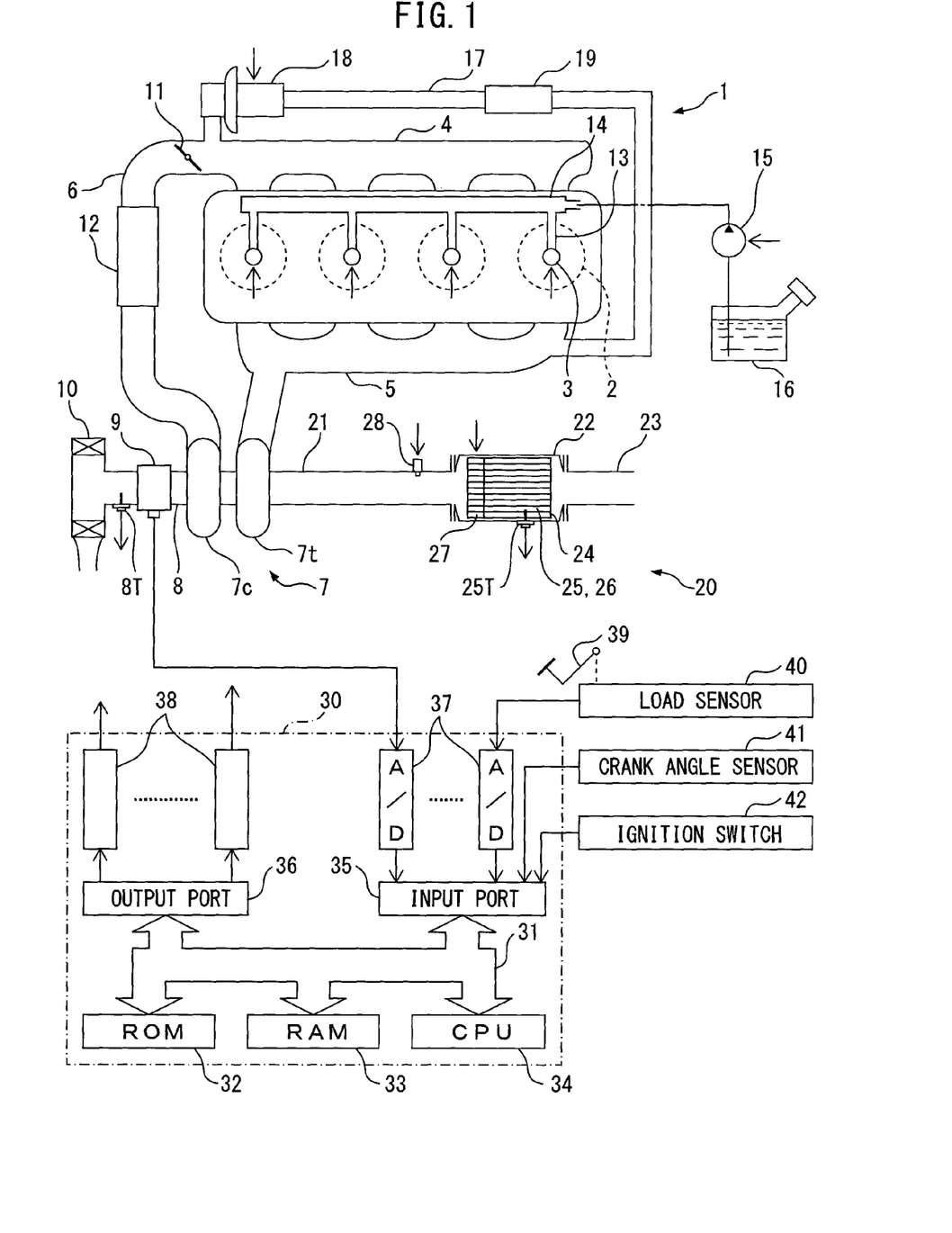
FIG. 1 is an overview of an internal combustion engine.

Referring to FIG. 1, 1 indicates a body of a compression ignition type internal combustion engine, 2 a combustion chamber of a cylinder, 3 an electromagnetic control type fuel injector for injecting fuel into a corresponding combustion chamber 2, 4 an intake manifold, and 5 an exhaust manifold. The intake manifold 4 is connected through an intake duct 6 to an outlet of a compressor 7c of an exhaust turbocharger 7, while the inlet of the compressor 7c is connected through an intake introduction pipe 8 to an air flow meter 9 and air cleaner 10. Inside the intake duct 6, an electrical control type throttle valve 11 is arranged. Further, around the intake duct 6, a cooling device 12 is arranged for cooling the intake air which flows through the inside of the intake duct 6. On the other hand, the exhaust manifold 5 is connected to an inlet of an exhaust turbine 7t of the exhaust turbocharger 7, while the outlet of the exhaust turbine 7t is connected to an exhaust post-treatment device 20.

Each fuel injector 3 is connected with a fuel feed pipe 13 to a common rail 14. This common rail 14 is connected through an electrical control type variable discharge fuel pump 15 to a fuel tank 16. The fuel inside the fuel tank 16 is supplied by a fuel pump 15 inside the common rail 14. The fuel which is supplied to the inside of the common rail 14 is supplied through the fuel feed pipes 13 to the fuel injectors 3. In the embodiment which is shown in FIG. 1, this fuel is comprised of diesel oil. In another embodiment which is not shown, the internal combustion engine is comprised of a spark ignition type internal combustion engine which burns fuel under a lean air-fuel ratio. In this case, the fuel is comprised of gasoline.

The exhaust manifold 5 and the intake manifold 4 are connected with each other through an exhaust gas recirculation (hereinafter referred to as "EGR") passage 17. Inside the EGR passage 17, an electrical control type EGR control valve 18 is arranged. Further, around the EGR passage 17, a cooling device 19 is arranged for cooling the EGR gas which flows through the inside of the EGR passage 17.

The exhaust post-treatment device 20 is provided with an exhaust pipe 21 which is connected to the outlet of the exhaust turbine 7t. This exhaust pipe 21 is connected through a casing 22 to an exhaust pipe 23. Inside the casing 22, a particulate filter 24 is arranged for trapping particulate matter in the exhaust gas. On the particulate filter 24, an $NO_x$ adsorbent 25 for adsorbing $NO_x$ in the exhaust gas and an $NO_x$ purifying catalyst 26 for purifying $NO_x$ in the exhaust gas are carried. Further, upstream of the particulate filter 24 inside the casing 22, an electric heater 27 is arranged integrally with the particulate filter 24. Furthermore, in the exhaust pipe 21 which is positioned upstream of the $NO_x$ purifying catalyst 26, a reducing agent feed valve 28 which feeds a reducing agent into the exhaust gas is provided.

The electronic control unit 30 is comprised of a digital computer which is provided with components which are connected with each other by a bidirectional bus 31 such as a ROM (read only memory) 32, RAM (random access memory) 33, CPU (microprocessor) 34, input port 35, and output port 36. At the intake introduction pipe 8, a temperature sensor 8T is attached for detecting the temperature of the air inside the intake introduction pipe 8. At the $NO_x$ adsorbent 25, a temperature sensor 25T is attached for detecting the temperature of the $NO_x$ adsorbent 25. In the embodiment which is shown in FIG. 1, the temperature of the $NO_x$ adsorbent 25 expresses the temperatures of the particulate filter 24 and $NO_x$ purifying catalyst 26. The output voltages of the air flow meter 9 and temperature sensors 8T and 25T are input through the corresponding AD converters 37 to the input port 35. Further, an accelerator pedal 39 is connected to a load sensor 40 which generates an output voltage proportional to the quantity of depression of the accelerator pedal 39. The output voltage of the load sensor 40 is input through a corresponding AD converter 37 to the input port 35. Furthermore, a crank angle sensor 41 which generates an output pulse each time the crankshaft rotates by for example 30 degrees is connected to the input port 35. At the CPU 34, the output pulses from the crank angle sensor 41 are used as the basis to calculate the engine speed. Further, a signal which expresses if an ignition switch 42 which is operated by the vehicle driver is on or off is input to the input port 35. On the other hand, the output port 36 is connected through corresponding drive circuits 38 to the fuel injectors 3, a drive device of the throttle valve 11, fuel pump 15, EGR control valve 18, electric heater 27, and reducing agent feed valve 28.

Figure 2A:
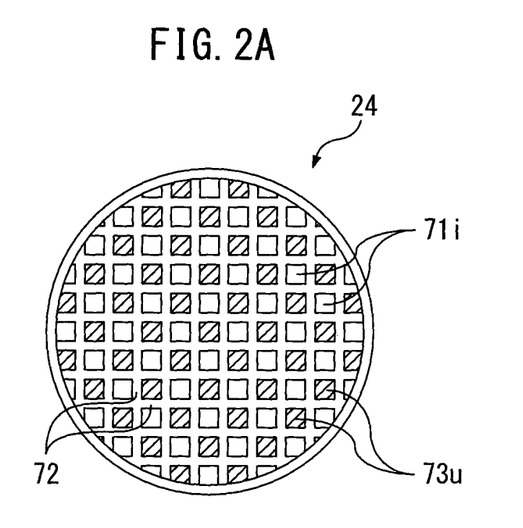
FIG. 2A is a front view of a particulate filter.
Figure 2B:
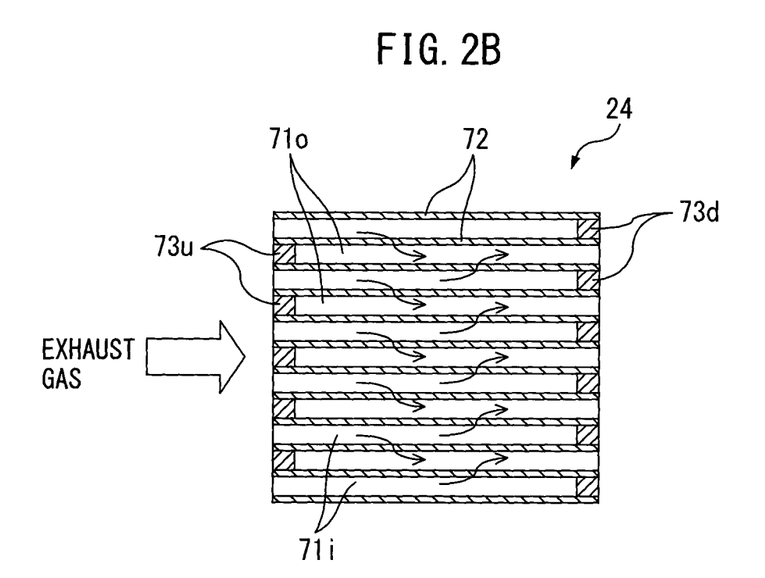
FIG. 2B is a side cross-sectional view of a particulate filter.

FIG. 2A and FIG. 2B show the structure of a wall flow type particulate filter 24. Note that, FIG. 2A shows a front view of the particulate filter 24, while FIG. 2B shows a side cross-sectional view of the particulate filter 24. As shown in FIG. 2A and FIG. 2B, the particulate filter 24 forms a honeycomb structure which is provided with plurality of exhaust flow paths 71i and 71o which extend in parallel with each other and partition walls 72 which separate these exhaust flow paths 71i and 71o from each other. In the embodiment which is shown in FIG. 2A, the exhaust flow paths 71i and 71o are comprised of exhaust gas inflow passages 71i with upstream ends which are open and with downstream ends which are closed by stoppers 73d and exhaust gas outflow passages 71o with upstream ends which are closed by stoppers 73u and with downstream ends which are open. Note that the hatched parts in FIG. 2A show the stoppers 73u. Therefore, the exhaust gas inflow passages 71i and exhaust gas outflow passages 71o are alternately arranged via thin partition walls 72. In other words, in the exhaust gas inflow passages 71i and exhaust gas outflow passages 71o, each exhaust gas inflow passage 71i is surrounded by four exhaust gas outflow passages 71o and each exhaust gas outflow passage 71o is surrounded by four exhaust gas inflow passages 71i. In another embodiment which is not shown, the exhaust flow path is comprised of exhaust gas inflow passages with upstream ends and downstream ends which are open and exhaust gas outflow passages with upstream ends which are closed by stoppers and with downstream ends which are open.

The partition walls 72 are formed from porous materials, for example, cordierite, silicon carbide, silicon nitride, zirconia, titania, alumina, silica, mullite, lithium aluminum silicate, zirconium phosphate and other such ceramics. Therefore, as shown in FIG. 2B by the arrows, the exhaust gas first flows into the exhaust gas inflow passages 71i, then passes through the surrounding partition walls 72 and flows out to the inside of the adjoining exhaust gas outflow passages 71o. In this way, the partition walls 72 form the inner circumferential surfaces of the exhaust gas inflow passages 71i. In another embodiment which is not shown, the partition walls or substrates are formed from porous resistance heating materials, for example, a Ni—Cr-based alloy, molybdenum disilicide ($MoSi_2$) or other metal heating element, of silicon carbide (SiC) or other nonmetal heating element. In this case, the partition walls are electrified whereby the $NO_x$ adsorbent 25 is raised in temperature. Therefore, the partition walls act as the electric heater 27.

Figure 3:
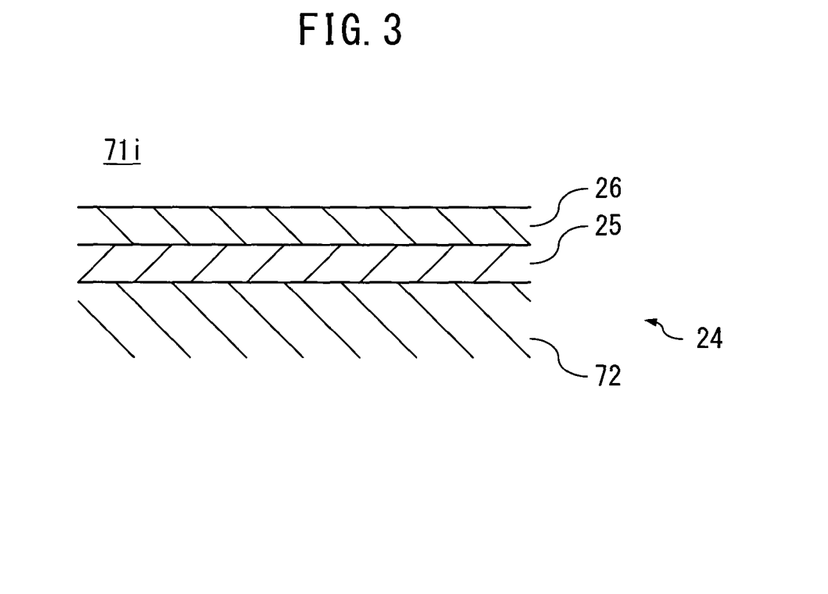
FIG. 3 is a partial enlarged cross-sectional view of a partition wall of a particulate filter.

FIG. 3 shows a partial enlarged cross-sectional view of a partition wall 72. As shown in FIG. 3, on the side surface of the partition wall 72 at the exhaust gas inflow passage 71i side, a layer of an $NO_x$ adsorbent 25 is formed. On the layer of the $NO_x$ adsorbent 25, a layer of an $NO_x$ purifying catalyst 26 is formed.

In the embodiment according to the present invention, the $NO_x$ adsorbent 25 includes zeolite. In another embodiment which is not shown, the $NO_x$ adsorbent 25 includes manganese Mn.

When the temperature of the $NO_x$ adsorbent 25 is low, $NO_x$ is adsorbed at the $NO_x$ adsorbent 25. When the temperature of the $NO_x$ adsorbent 25 rises, the adsorbed $NO_x$ is desorbed and released from the $NO_x$ adsorbent 25. Further, the moisture is similarly adsorbed at the $NO_x$ adsorbent 25 and desorbed from the $NO_x$ adsorbent 25.

Figure 4:
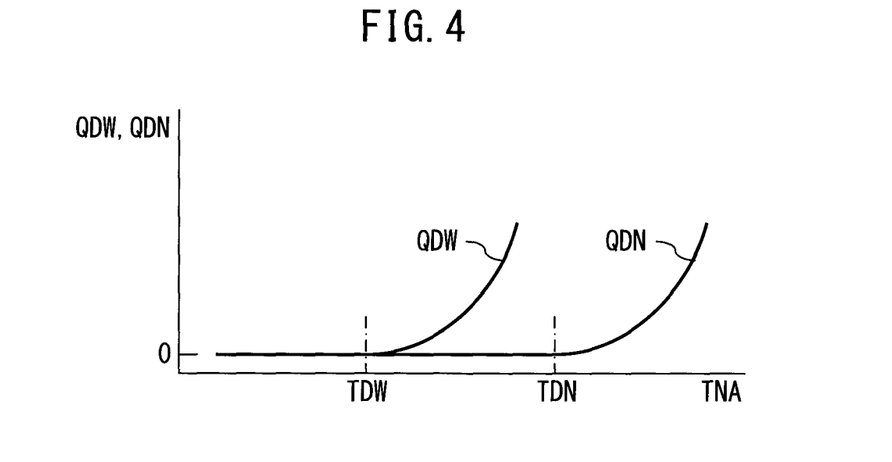
FIG. 4 is a graph for explaining the moisture desorption temperature and $NO_x$ desorption temperature.

FIG. 4 shows the quantity QDW of moisture and the quantity QDN of $NO_x$ which are desorbed from the $NO_x$ adsorbent 25. As will be understood from FIG. 4, when the temperature TNA of the $NO_x$ adsorbent 25 is lower than the moisture desorption temperature TDW, the quantity of desorbed moisture QDW is maintained at substantially zero. Therefore, the $NO_x$ adsorbent 25 does not desorb moisture much at all. When raising the temperature TNA of the $NO_x$ adsorbent 25 and the temperature TNA of the $NO_x$ adsorbent 25 reaches the moisture desorption temperature TDW, the quantity of desorbed moisture QDW increases from zero and therefore the moisture which is adsorbed at the $NO_x$ adsorbent 25 starts to be desorbed. On the other hand, when the temperature TNA of the $NO_x$ adsorbent 25 is lower than the $NO_x$ desorption temperature TDN, the quantity QDN of desorbed $NO_x$ is maintained at substantially zero. Therefore, the $NO_x$ adsorbent 25 does not desorb $NO_x$ much at all. When the temperature TNA of the $NO_x$ adsorbent 25 is further raised and the temperature TNA of the $NO_x$ adsorbent 25 reaches the $NO_x$ desorption temperature TDN, the quantity QDN of desorbed $NO_x$ increases from zero, therefore the $NO_x$ which is adsorbed at the $NO_x$ adsorbent 25 starts to be desorbed. In the embodiment according to the present invention, the moisture desorption temperature TDW is made about 100° C., and the $NO_x$ desorption temperature TDN is made about 180° C. or higher than the moisture desorption temperature TDW.

On the other hand, the $NO_x$ purifying catalyst 26, in the embodiment according to the present invention, is comprised of an $NO_x$ selective reduction catalyst which is suitable for reducing $NO_x$ in exhaust gas by a reducing agent under an oxygen excess. This $NO_x$ selective reduction catalyst uses titania $TiO_2$ as a carrier and contains vanadium oxide $V_2O_5$ carried on this carrier or uses zeolite ZSM5 as a carrier and contains copper Cu carried on this carrier. Further, a urea aqueous solution is supplied from the reducing agent feed valve 28, and ammonia which is generated from the urea aqueous solution acts as a reducing agent. In another embodiment which is not shown, a reducing agent constituted by fuel (hydrocarbons) is used.

If referring to the ratio of the air and fuel (hydrocarbons) which are supplied into the engine intake passage and exhaust passage upstream of the combustion chambers 2 and $NO_x$ purifying catalyst 26 as the air-fuel ratio of the exhaust gas, in another embodiment which is not shown, the $NO_x$ purifying catalyst 26 is comprised of an $NO_x$ storage catalyst which stores $NO_x$ which is contained in the exhaust gas when the air-fuel ratio of the inflowing exhaust gas is lean and releases the stored $NO_x$ when the air-fuel ratio of the inflowing exhaust gas becomes rich. This $NO_x$ storage catalyst is provided with a precious metal catalyst such as platinum Pt, rhodium Rh, palladium Pd, and a basicity layer which contains at least one selected from potassium K, sodium Na, cesium Cs, or other such alkali metal, barium Ba, calcium Ca, or other such alkali earth metal, a lanthanoid or other such rare earth and silver Ag, copper Cu, iron Fe, iridium Ir, or other such metal which can donate electrons to $NO_x$. Note that the term "storage" includes adsorption and absorption.

Figure 5:
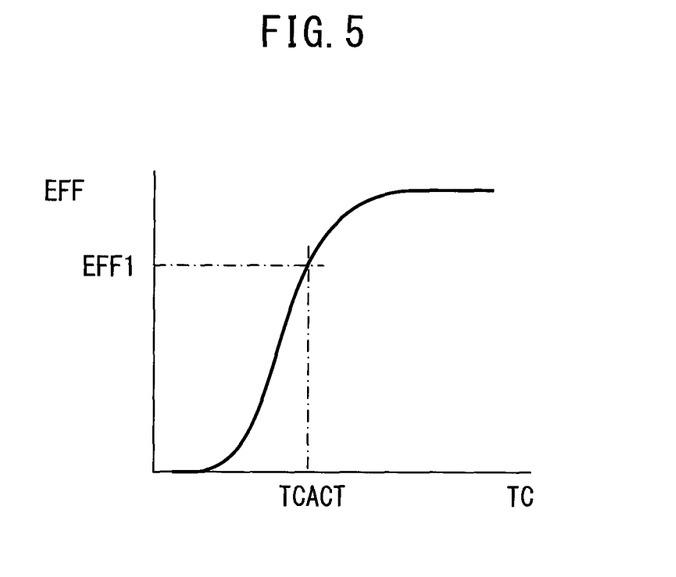
FIG. 5 is a graph for explaining the activation temperature of the $NO_x$ purifying catalyst.

FIG. 5 shows the relationship between the $NO_x$ purifying ratio EFF of the $NO_x$ purifying catalyst 26 and the temperature TC of the $NO_x$ purifying catalyst 26. As shown in FIG. 5, the $NO_x$ purifying ratio EFF of the $NO_x$ purifying catalyst 26 becomes higher as the temperature TC of the $NO_x$ purifying catalyst 26 becomes higher and reaches a peak. In this case, if the temperature TC of the $NO_x$ purifying catalyst 26 is the activation temperature TCACT or more, the $NO_x$ purifying ratio EFF becomes the allowable value EFF1 or more. In the embodiment according to the present invention, the activation temperature TCACT of the $NO_x$ purifying catalyst 26 is made one substantially equal to the $NO_x$ desorption temperature TDN of the $NO_x$ adsorbent 25, that is, about 180° C. In another embodiment which is not shown, the activation temperature TCACT of the $NO_x$ purifying catalyst 26 is made lower than the $NO_x$ desorption temperature TDN of $NO_x$.

Now then, if operation of the internal combustion engine is started, exhaust gas is led into the particulate filter 24. In this case, even if the temperature of the $NO_x$ purifying catalyst 26 is lower than the activation temperature TCACT, $NO_x$ is adsorbed at the $NO_x$ adsorbent 25. As a result, release of $NO_x$ into the atmosphere is suppressed. Next, the exhaust gas causes the $NO_x$ adsorbent 25 and $NO_x$ purifying catalyst 26 to rise in temperature. If the temperature of the $NO_x$ adsorbent 25 reaches the $NO_x$ desorption temperature TDN, the adsorbed $NO_x$ starts to desorb from the $NO_x$ adsorbent 25 and the desorbed $NO_x$ flows into the $NO_x$ purifying catalyst 26. At this time, the temperature TC of the $NO_x$ purifying catalyst 26 has reached the activation temperature TCACT, therefore the $NO_x$ is purified by the $NO_x$ purifying catalyst 26. Note that when the temperature TC of the $NO_x$ purifying catalyst 26 reaches the activation temperature TCACT, the feed of reducing agent from the reducing agent feed valve 28 is started.

In this regard, when the operation of the internal combustion engine is started, if the $NO_x$ adsorbent 25 adsorbs moisture, the quantity of $NO_x$ which the $NO_x$ adsorbent 25 can adsorb ends up becoming smaller by the quantity of this moisture. On the other hand, if raising the temperature TNA of the $NO_x$ adsorbent 25 up to the moisture desorption temperature TDW, it is possible to make the $NO_x$ adsorbent 25 desorb moisture.

Therefore, in an embodiment according to the present invention, when a signal requesting startup of the internal combustion engine is issued, the supply of electric power to the electric heater 27 is started before the internal combustion engine completely warms up and a quantity of electric power making the temperature TNA of the $NO_x$ adsorbent 25 equal to or higher than the moisture desorption temperature TDW but lower than the $NO_x$ desorption temperature TDN is supplied to the electric heater 27. As a result, it is possible to raise the temperature of the $NO_x$ adsorbent 25 before the exhaust gas flows into the $NO_x$ adsorbent 25. Further, the temperature TNA of the $NO_x$ adsorbent 25 is made equal to or higher than the moisture desorption temperature TDW but lower than the $NO_x$ desorption temperature TDN, so it is possible to make the $NO_x$ absorbent desorb moisture while the $NO_x$ adsorbent 25 adsorbs $NO_x$. Therefore, it is possible to increase the quantity of $NO_x$ which the $NO_x$ adsorbent 25 can adsorb. Therefore, it is possible to maintain the adsorption capacity of the $NO_x$ adsorbent 25 small while further suppressing $NO_x$ from being released into the atmosphere until the temperature TC of the $NO_x$ purifying catalyst 26 reaches the activation temperature TCACT.

In an embodiment according to the present invention, the signal requesting startup of the internal combustion engine is comprised of a signal which indicates that the ignition switch 42 is on. In another embodiment which is not shown, the signal requesting startup of the internal combustion engine is comprised of a signal indicating that the starter motor switch is on, a signal indicating that the vehicle door is open, or a signal indicating that the vehicle door is unlocked. According to still another embodiment which is not shown, in a hybrid vehicle which is provided with an electric motor and internal combustion engine and in which the internal combustion engine is operated when the vehicle drive force should be increased or the stored electricity of the battery should be increased, the signal requesting startup of the internal combustion engine is comprised of a signal requesting increase of the vehicle drive force or a signal requesting increase of the stored electricity of the battery.

As explained above, if electric power is supplied to the electric heater 27, moisture is desorbed from the $NO_x$ adsorbent 25. In the embodiment according to the present invention, it is judged if the quantity of adsorbed moisture of the $NO_x$ adsorbent 25 becomes smaller than a threshold quantity during the supply of electric power to the electric heater 27. When it is not judged that the quantity of adsorbed moisture of the $NO_x$ adsorbent 25 has become smaller than the threshold quantity, the supply of electric power to the electric heater 27 is continued. When it is judged that the quantity of adsorbed moisture of the $NO_x$ adsorbent 25 has become smaller than the threshold quantity, the supply of electric power to the electric heater 27 is stopped. As a result, excess electric power can be kept from being supplied to the electric heater 27.

Figure 6:
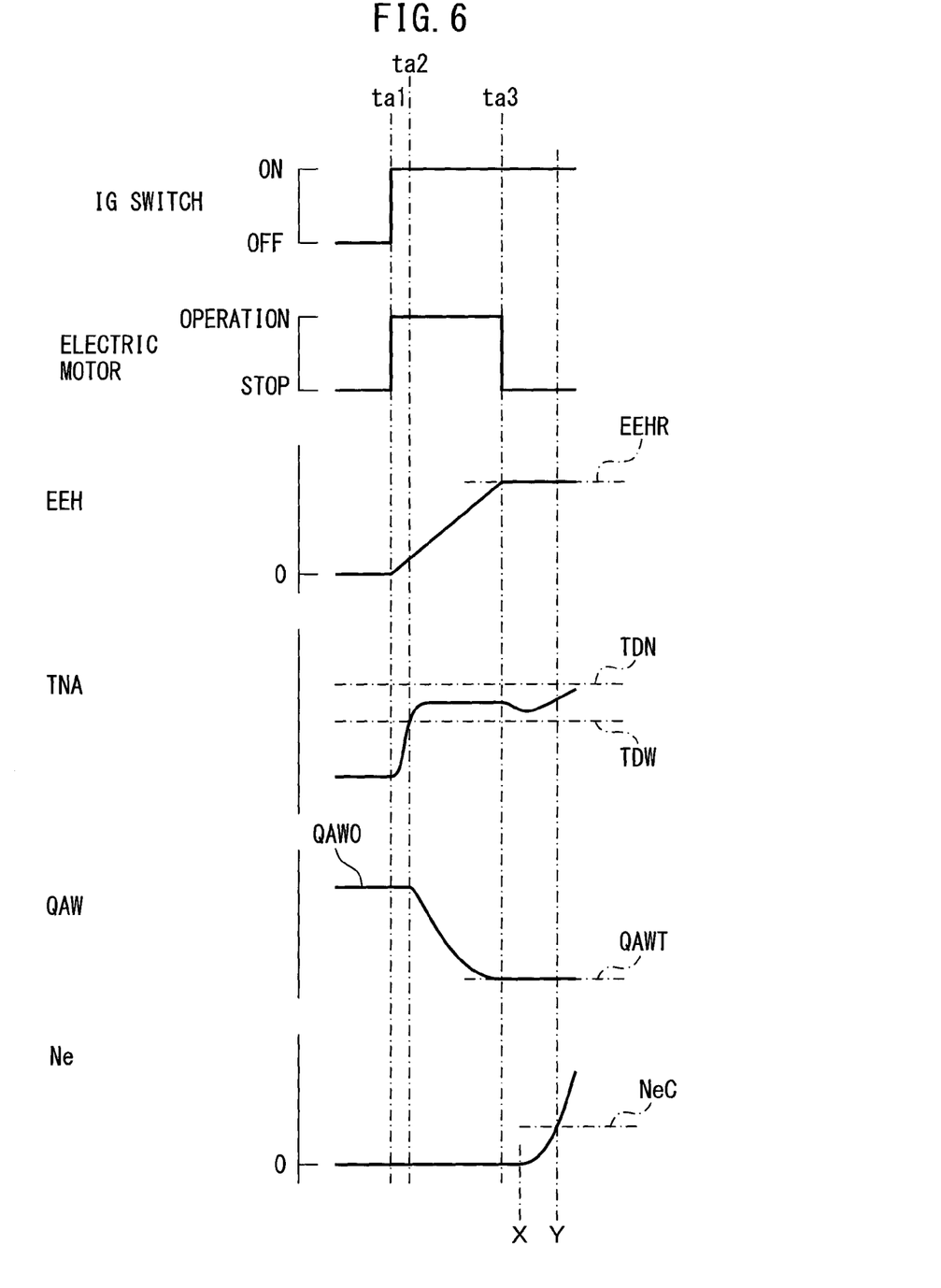
FIG. 6 is a time chart which explains electric heater control of an embodiment according to the present invention.

Next, referring to FIG. 6, the embodiment of the present invention will be further explained. Referring to FIG. 6, the time ta1 shows the timing when the ignition switch 42 is turned on. In the embodiment which is shown in FIG. 6, the quantity QAW of adsorbed moisture of the $NO_x$ adsorbent 25 at the time ta1 is an initial quantity QAW0. When the ignition switch 42 is turned on at the time ta1, the supply of electric power to the electric heater 27 is started. That is, the electric heater 27 is operated. As a result, the temperature TNA of the $NO_x$ adsorbent 25 rises. Further, the quantity EEH of electric power which is supplied to the electric heater 27 starts to increase.

Next, when the temperature TNA of the $NO_x$ adsorbent 25 reaches the moisture desorption temperature TDW at the time ta2, the moisture which is adsorbed at the $NO_x$ adsorbent 25 starts to be desorbed. As a result, the quantity QAW of adsorbed moisture of the $NO_x$ adsorbent 25 starts to be reduced. In this case, a quantity of electric power making the temperature TNA of the $NO_x$ adsorbent 25 equal to or higher than the moisture desorption temperature TDW but lower than the $NO_x$ desorption temperature TDN is supplied to the electric heater 27. As a result, moisture is desorbed from the $NO_x$ adsorbent 25 while $NO_x$ is adsorbed at the $NO_x$ adsorbent 25.

Next, when the quantity of the electric power EEH which is supplied to the $NO_x$ adsorbent 25 reaches the required electric power quantity EEHR at the time ta3, the supply of electric power to the electric heater 27 is stopped. This required electric power quantity EEHR is the quantity of electric power which is required for making the quantity QAW of adsorbed moisture of the $NO_x$ adsorbent 25 smaller than the threshold quantity QAWT from the initial quantity QAW0. Therefore, when the quantity of the electric power EEH which is supplied to the $NO_x$ adsorbent 25 reaches the required electric power quantity EEHR, it can be judged that the quantity QAW of adsorbed moisture of the $NO_x$ adsorbent 25 has become smaller than the threshold quantity QAWT of adsorbed moisture. In the embodiment which is shown in FIG. 6, at the time ta3, the quantity QAW of adsorbed moisture of the $NO_x$ adsorbent 25 has become smaller than the threshold quantity QAWT of adsorbed moisture. The threshold quantity QAWT is set to substantially zero in the embodiment which is shown in FIG. 6.

Figure 7:
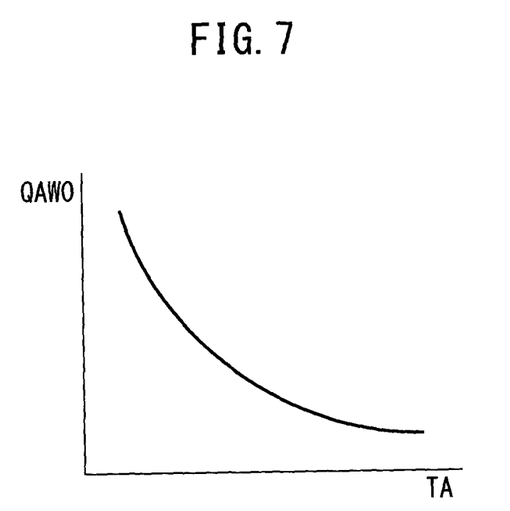
FIG. 7 is a view which shows a map of an initial quantity QAW0 of adsorbed moisture.

The required electric power quantity EEHR, generally speaking, is expressed as the total of the quantity of electric power which is required for raising the temperature TNA of the $NO_x$ adsorbent 25 to the moisture desorption temperature TDW and the quantity of electric power which is required for making the quantity (QAW0−QAWT) of moisture desorb from the $NO_x$ adsorbent 25. The former can be found in advance in accordance with the heat capacity of the $NO_x$ adsorbent 25, more accurately speaking, in the embodiment which is shown in FIG. 1, the heat capacities of the $NO_x$ adsorbent 25, $NO_x$ purifying catalyst 26, and particulate filter 24. On the other hand, the latter is determined in accordance with the quantity of moisture which is adsorbed at the $NO_x$ adsorbent 25 when the supply of electric power to the electric heater 27 is started, that is, the above-mentioned initial quantity QAW0. The initial quantity QAW0 of adsorbed moisture, as shown in FIG. 7, becomes greater the atmospheric temperature TA when the supply of electric power to the electric heater 27 is started becomes lower. The initial quantity QAW0 of adsorbed moisture is stored as a function of the atmospheric temperature TA in the form of the map shown in FIG. 7 in advance in the ROM 32. Note that, the atmospheric temperature TA when the supply of electric power to the electric heater 27 is started is detected by the temperature sensor 8T (FIG. 1).

In FIG. 6, X shows the timing when the operation of the internal combustion engine is started, and Y shows the timing when the internal combustion engine is completely warmed up, that is, the timing when the engine speed Ne exceeds a predetermined set speed NeC. In the embodiment which is shown in FIG. 6, before the timing Y when the internal combustion engine is completely warmed up, the supply of electric power to the electric heater 27 is started (ta1). Therefore, the temperature of the $NO_x$ adsorbent 25 can be quickly raised. Further, in the embodiment which is shown in FIG. 6, the supply of electric power to the electric heater 27 is stopped (ta3), then engine operation is started (X) and the internal combustion engine is completely warmed up (Y). Therefore, before the exhaust gas from the internal combustion engine flows into the $NO_x$ adsorbent 25, the quantity of $NO_x$ which the $NO_x$ adsorbent 25 can adsorb is made to increase in advance. In another embodiment which is not shown, the supply of electric power to the electric heater 27 is started (ta1), next engine operation is started (X), next the supply of electric power to the electric heater 27 is stopped (ta3), next the internal combustion engine completely warms up (Y). Further, in another embodiment which is not shown, the supply of electric power to the electric heater 27 is started (ta1), then engine operation is started (X), then the internal combustion engine completely warms up (Y), then the supply of electric power to the electric heater 27 is stopped (ta3).

Figure 8:
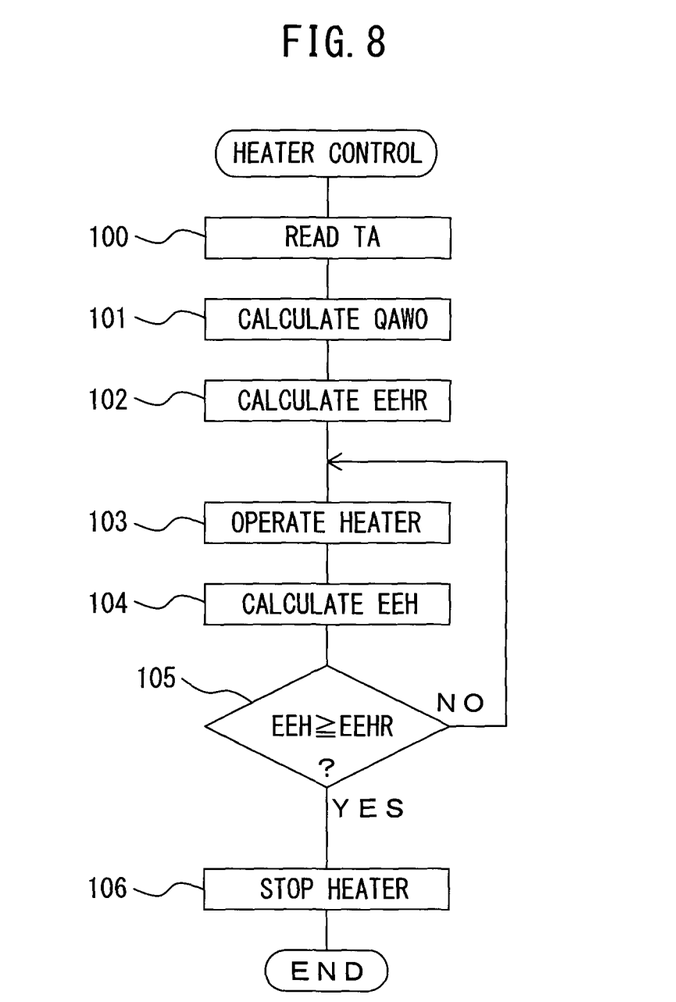
FIG. 8 is a flow chart which shows an electric heater control routine.

FIG. 8 shows the routine for executing the electric heater control of the embodiment according to the present invention. This routine is performed one time when the ignition switch 42 is turned on. Referring to FIG. 8, at step 100, the atmospheric temperature TA is read. At the following step

101, the initial quantity QAW0 of adsorbed moisture is calculated from the map of FIG. 7. At the following step 102, the required electric power quantity EEHR is calculated. At the following step 103, the supply of electric power to the electric heater 27 is started. At the following step 104, the quantity of the electric power EEH which is supplied to the electric heater 27 is calculated. At the following step 105, it is judged if a quantity of the electric power EEH which is supplied to the electric heater 27 is the required electric power quantity EEHR or more. When EEH<EEHR, the routine returns to step 103 where the supply of electric power to the electric heater 27 is continued. When EEH≥EEHR, the routine proceeds to step 106 where the supply of electric power to the electric heater 27 is stopped.

Figure 9:
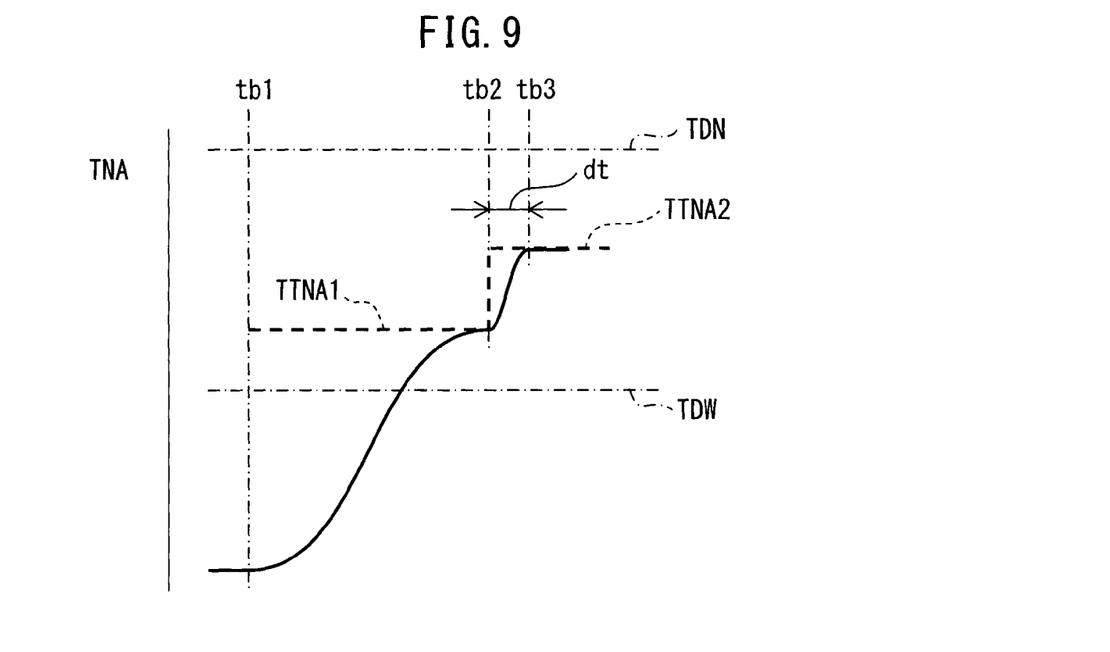
FIG. 9 is a time chart which explains electric heater control of another embodiment according to the present invention.

Next, referring to FIG. 9, another embodiment according to the present invention will be explained. Referring to FIG. 9, the supply of electric power to the electric heater 27 is started at the time tb1. In this case, the supply of electric power to the electric heater 27 is controlled so that the temperature TNA of the $NO_x$ adsorbent 25 becomes a first target temperature TTNA1. Therefore, the temperature TNA of the $NO_x$ adsorbent 25 gradually rises. Next, when the temperature TNA of the $NO_x$ adsorbent 25 reaches the first target temperature TTNA1 at the time tb2, the quantity of the electric power which is supplied to the electric heater 27 is increased in steps so that the temperature TNA of the $NO_x$ adsorbent 25 becomes a second target temperature TTNA2. As a result, the temperature TNA of the $NO_x$ adsorbent 25 rises.

Next, when the temperature TNA of the $NO_x$ adsorbent 25 reaches the second target temperature TTNA2 at the time tb3, the time dt which is required for the temperature TNA of the $NO_x$ adsorbent 25 to rise from the first target temperature TTNA1 to the second target temperature TTNA2 is calculated (dt=tb3−tb2). This required time dt expresses the speed of rise of the temperature TNA of the $NO_x$ adsorbent 25 when making the quantity of the electric power which is supplied to the electric heater 27 rise in steps.

Figure 10:
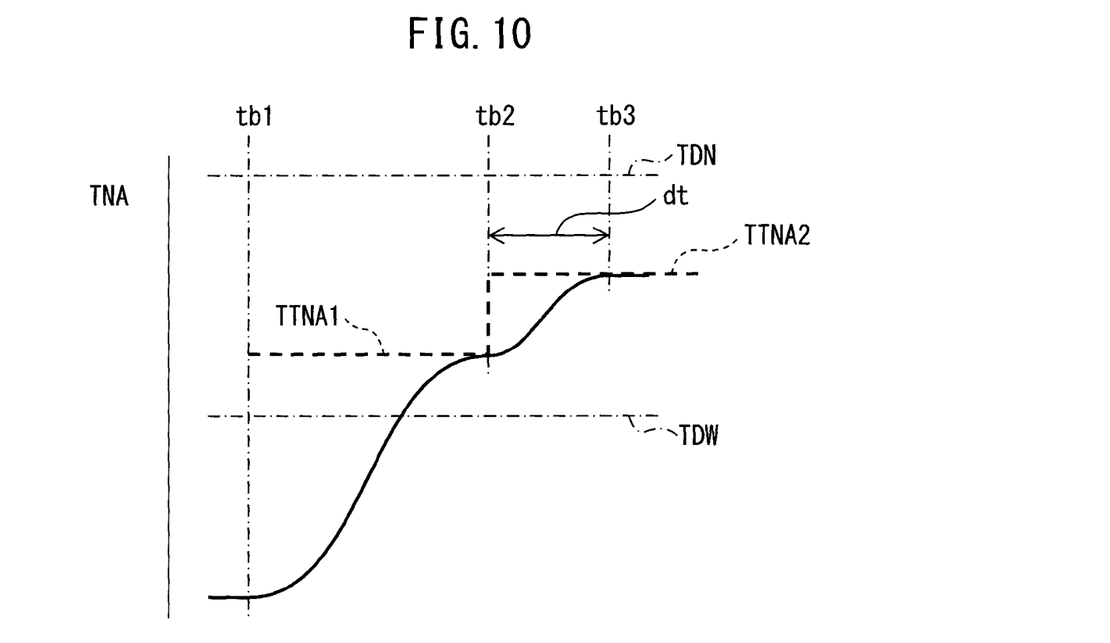
FIG. 10 is a time chart which explains electric heater control of another embodiment according to the present invention.

This required time dt becomes shorter as the quantity of moisture which is absorbed at the $NO_x$ adsorbent 25 becomes smaller. FIG. 9 shows the case where the quantity QAW of adsorbed moisture of the $NO_x$ adsorbent 25 is small and therefore the required time dt is short. As opposed to this, FIG. 10 shows the case where the quantity QAW of adsorbed moisture of the $NO_x$ adsorbent 25 is large and therefore the required time dt is long.

Therefore, in another embodiment according to the present invention, it is judged if the required time dt is shorter than a predetermined set time dtS. When the required time dt is shorter than the set time dtS, it is judged that the quantity QAW of adsorbed moisture of the $NO_x$ adsorbent 25 becomes smaller than the threshold quantity QAWT and the supply of electric power to the electric heater 27 is stopped. As a result, excessive supply of electric power to the electric heater 27 is blocked.

When the required time dt is longer than the predetermined set time dtS, the supply of electric power to the electric heater 27 is continued. In this case, the supply of electric power to the electric heater 27 is controlled so that the temperature TNA of the $NO_x$ adsorbent 25 becomes the first target temperature TTNA1. Next, if the temperature TNA of the $NO_x$ adsorbent 25 falls to the first target temperature TTNA1, the electric power which is supplied to the electric heater 27 is again increased in steps and the required time dt is again calculated. Next, it is again judged that the required time dt is shorter than the predetermined set time dtS.

That is, in another embodiment according to the present invention, the speed of rise of temperature TNA of the $NO_x$ adsorbent 25 when increasing in steps the electric power which is supplied to the electric heater 27 is detected. When the speed of rise is higher than the predetermined set speed, it is judged that the quantity QAW of adsorbed moisture of the $NO_x$ adsorbent 25 has become smaller than threshold quantity QAWT.

Note that, the first target temperature TTNA1 and the second target temperature TTNA2 are set between the moisture desorption temperature TDW and the $NO_x$ desorption temperature TDN. In another embodiment according to the present invention, the first target temperature TTNA1 is set to 110° C., while the second target temperature TTNA2 is set to 120° C.

Figure 11:
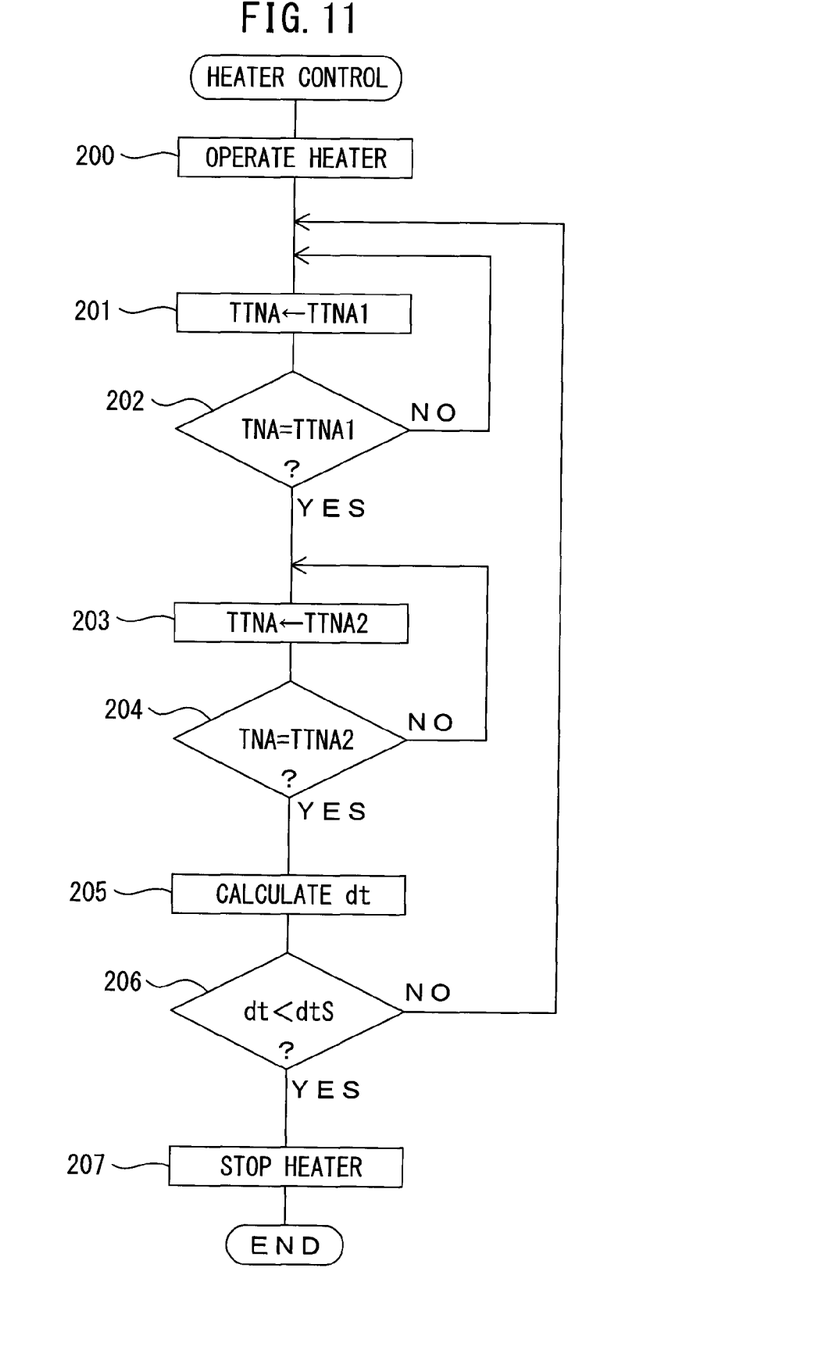
FIG. 11 is a flow chart which shows electric heater control of another embodiment according to the present invention.

FIG. 11 shows a routine for executing electric heater control of an embodiment according to the present invention. This routine is performed only once when the ignition switch 42 is turned on. Referring to FIG. 11, at step 200, the electric heater 27 is operated. At the following step 201, the target temperature TTNA of the $NO_x$ adsorbent 25 is set to the first target temperature TTNA1. As a result, the supply of electric power to the electric heater 27 is controlled so that the temperature TNA of the $NO_x$ adsorbent 25 becomes the first target temperature TTNA1. At the following step 202, it is judged if the temperature TNA of the $NO_x$ adsorbent 25 has become the first target temperature TTNA1. When TNA≠TTNA1, the routine returns to step 201. When TNA=TTNA1, the routine next proceeds to step 203 where the target temperature TTNA of the $NO_x$ adsorbent 25 is set to the second target temperature TTNA2. At the following step 204, it is judged if the temperature TNA of the $NO_x$ adsorbent 25 has become the second target temperature TTNA2. When TNA≠TTNA2, the routine returns to step 203. When TNA=TTNA2, next the routine proceeds to step 205 where the required time dt is calculated. At the following step 206, it is judged if the required time dt is shorter than a predetermined set time dtS. When dt≥dtS, the routine returns to step 201. That is, electric power continues to be supplied to the electric heater 27. When dt<dtS, the routine proceeds to step 207 where electric power stops being supplied to the electric heater 27.

As explained referring to FIG. 3, in the embodiment which is shown in FIG. 1, the $NO_x$ adsorbent 25 and the $NO_x$ purifying catalyst 26 are carried on a mutually common base material. The $NO_x$ adsorbent 25 is arranged at the side close to the base material, while the $NO_x$ purifying catalyst 26 is arranged at the side far from the substrate. The substrate is configured from a particulate filter 24. By doing this, not only the temperature of the $NO_x$ adsorbent 25, but also the temperatures of the particulate filter 24 and $NO_x$ purifying catalyst 26 can be made to quickly rise by the electric heater 27. Further, the volume of the casing 22 can be reduced.

Figure 12:
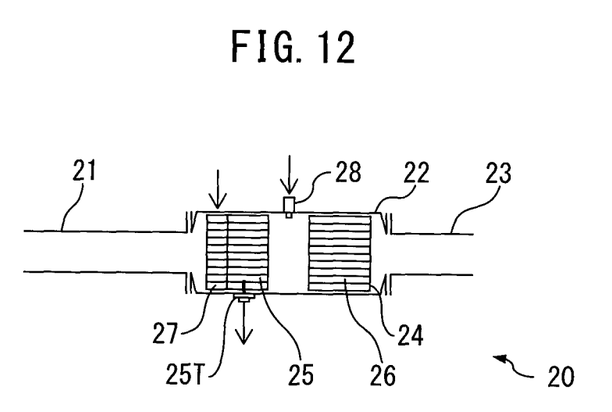
FIG. 12 is a flow chart which shows another exhaust purification control routine of an $NO_x$ adsorbent.

FIG. 12 shows another embodiment of the $NO_x$ adsorbent 25. In this embodiment, the $NO_x$ adsorbent 25 and the $NO_x$ purifying catalyst 26 are carried on separate substrates. The $NO_x$ adsorbent 25 is arranged at the upstream side in the exhaust flow while the $NO_x$ purifying catalyst 26 is arranged at the downstream side in the exhaust gas flow. In this case, the substrate which carries the $NO_x$ adsorbent 25 forms a honeycomb structure and is provided with a plurality of exhaust gas flow paths which are separated by thin partition walls. These exhaust gas flow paths are open at the upstream ends and downstream ends. An $NO_x$ adsorbent 25 is carried on the two surfaces of the partition walls. This substrate is configured in the same way as the particulate filter 24. On the other hand, the substrate which carries the $NO_x$ purifying catalyst 26 is comprised of the particulate filter 24. Further, the electric heater 27 is attached to the $NO_x$ adsorbent 25, while the reducing agent feed valve 28 is arranged between the $NO_x$ adsorbent 25 and the $NO_x$ purifying catalyst 26.

In the embodiment which is shown in FIG. 12, the particulate filter 24 is arranged downstream of the $NO_x$ adsorbent 25. As a result, exhaust gas which passes through the $NO_x$ adsorbent 25 which is raised in temperature by the electric heater 27 flows in the particulate filter 24, so the temperatures of the particulate filter 24 and $NO_x$ purifying catalyst 26 are made to quickly rise.

If expressing the invention to encompass the embodiment which is shown in FIG. 1 and the embodiment which is shown in FIG. 12, it can be said that the $NO_x$ adsorbent 25 and the $NO_x$ purifying catalyst 26 are arranged in the engine exhaust passage so that the $NO_x$ which is desorbed from the $NO_x$ adsorbent 25 is made to flow into the $NO_x$ purifying catalyst 26.

REFERENCE SIGNS LIST

1 engine body
21 exhaust pipe
24 particulate filter
25 $NO_x$ adsorbent
26 $NO_x$ purifying catalyst
27 electric heater
42 ignition switch

The invention claimed is:

1. An exhaust purification device for an internal combustion engine, comprising:
an $NO_x$ adsorbent for adsorbing $NO_x$ in exhaust gas and an $NO_x$ purifying catalyst for purifying $NO_x$ in the exhaust gas are arranged in an engine exhaust passage, the $NO_x$ adsorbent having the property of the adsorbed moisture starting to be desorbed when raising the temperature of the $NO_x$ adsorbent and the temperature of the $NO_x$ adsorbent reaches a moisture desorption temperature and of the adsorbed $NO_x$ starting to be desorbed when further raising the temperature of the $NO_x$ adsorbent and the temperature of the $NO_x$ adsorbent reaches an $NO_x$ desorption temperature;
an electric heater for raising the temperature of the $NO_x$ adsorbent; and
a controller configured to start to supply electric power to the electric heater before the internal combustion engine is completely warmed up when a signal which requests startup of the internal combustion engine is issued, and to supply the electric heater with a quantity of electric power making the temperature of the $NO_x$ adsorbent equal to or higher than the moisture desorption temperature but lower than the $NO_x$ desorption temperature.

2. The exhaust purification device for an internal combustion engine according to claim 1, wherein it is judged if the quantity of adsorbed moisture of the $NO_x$ adsorbent becomes smaller than a threshold quantity during supply of electric power to the electric heater and supply of electric power to the electric heater is stopped when it is judged that the quantity of adsorbed moisture of the $NO_x$ adsorbent has become smaller than the threshold quantity.

3. The exhaust purification device for an internal combustion engine according to claim 2, wherein a quantity of the electric power which is required for making the quantity of adsorbed moisture smaller than the threshold quantity is found and when the quantity of the electric power which is supplied to the electric heater reaches that required electric power quantity, it is judged that the quantity of adsorbed moisture of the $NO_x$ adsorbent has become smaller than the threshold quantity.

4. The exhaust purification device for an internal combustion engine according to claim 3, wherein said required electric power quantity is found based on the atmospheric temperature when the supply of electric power to the electric heater is started.

5. The exhaust purification device for an internal combustion engine according to claim 2, wherein the speed of rise of temperature of the $NO_x$ adsorbent when increasing a quantity of the electric power which is supplied to the electric heater in steps is detected and it is judged that the quantity of adsorbed moisture of the $NO_x$ adsorbent becomes smaller than the threshold quantity when the speed of rise is higher than a predetermined set speed.

6. The exhaust purification device for an internal combustion engine according to claim 1, wherein the $NO_x$ adsorbent and $NO_x$ purifying catalyst are arranged so that the $NO_x$ which is desorbed from the $NO_x$ adsorbent flows into the $NO_x$ purifying catalyst.

7. The exhaust purification device for an internal combustion engine according to claim 6, wherein the $NO_x$ adsorbent and the $NO_x$ purifying catalyst are carried on a mutually common substrate, the $NO_x$ adsorbent is arranged at the side close to the substrate, and the $NO_x$ purifying catalyst is arranged on the side far from the substrate.

8. The exhaust purification device for an internal combustion engine according to claim 7, wherein said substrate is comprised of partition walls of a particulate filter for trapping particulate matter in exhaust gas.

9. The exhaust purification device for an internal combustion engine according to claim 6, wherein the $NO_x$ adsorbent and the $NO_x$ purifying catalyst are carried on mutually separate substrates, the $NO_x$ adsorbent is arranged at an upstream side in the flow of exhaust, and the $NO_x$ purifying catalyst is arranged at a downstream side in the flow of exhaust gas.

10. The exhaust purification device for an internal combustion engine according to claim 9, wherein a particulate filter for trapping particulate matter in exhaust gas is arranged downstream of the $NO_x$ adsorbent.

\* \* \* \* \*